United States Patent
Walker, Sr.

[11] Patent Number: 5,833,562
[45] Date of Patent: Nov. 10, 1998

[54] SPLIT HUB ASSEMBLY

[76] Inventor: Jordan Dorman Walker, Sr., 1102 S. Perry St., Montgomery, Ala. 36104

[21] Appl. No.: 797,715

[22] Filed: Feb. 11, 1997

[51] Int. Cl.$^6$ .................................................... F16H 55/12
[52] U.S. Cl. ............................................. 474/96; 474/902
[58] Field of Search ............................. 474/95, 96, 902, 474/903

[56] References Cited

U.S. PATENT DOCUMENTS

| | | | |
|---|---|---|---|
| 2,417,467 | 3/1947 | Bryant, Jr. | 74/230.1 |
| 2,714,820 | 8/1955 | Chamberlain | 74/243 |
| 2,932,207 | 4/1960 | Whitney | 74/243 |
| 3,082,637 | 3/1963 | Paxton | 74/243 |
| 3,789,687 | 2/1974 | Cutter | 474/152 |
| 3,903,754 | 9/1975 | Morroni | 74/594.1 |
| 4,043,214 | 8/1977 | Westlake | 74/243 |
| 4,635,503 | 1/1987 | Sharon | 74/594.2 |
| 4,840,084 | 6/1989 | Durham | 74/594.1 |
| 4,964,842 | 10/1990 | Howard | 474/152 |
| 5,295,917 | 3/1994 | Hannum | 474/95 |

OTHER PUBLICATIONS

Schwartz, et al., Making the Right Shaft Connections, pp. 65–68 (Aug. 1996).

"Dodge" catalogue page showing Weyless locking assembly, cc–20, 1996.

*Primary Examiner*—Roger J. Schoeppel
*Attorney, Agent, or Firm*—Needle & Rosenberg, P.C.

[57] ABSTRACT

A split hub assembly including a split sprocket, a split hub, and members to connect the split sprocket together. The formed split sprocket is disposed over the split hub by complementarily tapered surfaces to maintain the split hub coupled together. Installation and removal of the present invention is significantly easier than standard prior art devices, plus it provides interchangeability of hubs and sprockets.

6 Claims, 2 Drawing Sheets

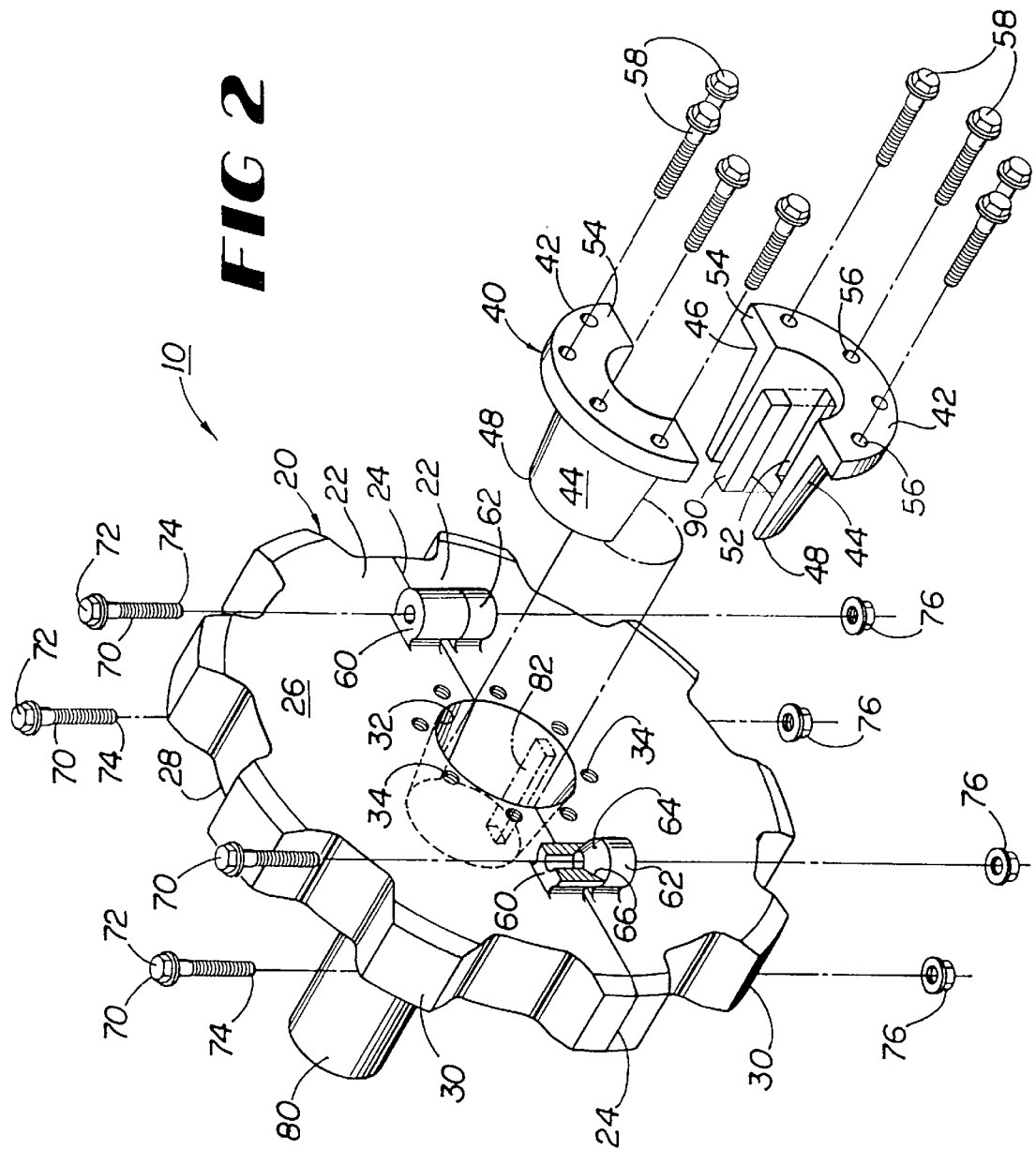

SPLIT HUB ASSEMBLY

BACKGROUND OF THE INVENTION

1. Field of the Invention

The present invention relates to a sprocket assembly used for the transmission of power, such as conveyors, and, more particularly, to an assembly in which both the sprocket and the hub have a split design to allow easier installation and removal thereof.

2. Background Art

Power transmitting sprocket and hub assemblies have been use in the art for years. An example is U.S. Pat. No. 2,714,820, issued to Chamberlain in 1955, which discloses a hub and a replaceable sprocket attached to the hub. The Chamberlain patent discloses two different systems for attaching the replaceable sprockets to the hub: (1) a sprocket having a threaded bore that complementarily engages the threaded outer diameter of the hub and (2) a sprocket having a bore that slidably engages the outer diameter of the hub and that is securably attached to the flange of the hub by a plurality of bolts. A problem with this design is that if the sprocket or hub is blocked from freely sliding off the supporting shaft, then removal of the components is difficult. That is, changing a sprocket or a hub on shafts with several other sprockets or support bearings is time consuming and expensive. A frequent problem is that bearings which have supported the shaft for several years are easily damaged during this process. An improvement in the art is disclosed in U.S. Pat. No. 4,964,842, issued to Howard in 1990, which teaches a split sprocket. The Howard patent, however, does not address the hub assembly.

Thus, a need exists in the art for an assembly in which both the sprocket and the hub are easily removable from a shaft. Such an improvement would facilitate the removal of either or both components, which is sometimes required in use. An example is "turning" (reversing on the shaft) the sprocket and hub wherein a new wearing surface of the sprocket's teeth is brought into contact with the chain or other component through which power transmission occurs.

Another need in the art is a means to precisely align the hub and sprocket with each other. That is, if a hub and sprocket are used which can be assembled around a shaft without requiring dismantling the shaft or adjacent sprockets, then the components need to be joined together to ensure proper alignment and prevent separation.

SUMMARY OF THE INVENTION

The above disadvantages of the prior art are satisfied by the present invention, which comprises a split sprocket, a split hub, and a means for coupling the split sprocket to the split hub. A pair of sprocket segments form the split sprocket and a pair of hub segments form the split hub. The split sprocket defines a sprocket bore which is axially tapered so that the diameter of the sprocket bore adjacent one side of the split sprocket is larger than the diameter of the sprocket bore adjacent its other side.

The split hub has an external surface and defines a hub bore. The hub bore is of a size to be disposed around a shaft so that the split hub maintains a constant radial position relative to the shaft. In addition, at least a portion of the external surface of the split hub can be complementarily received within the tapered sprocket bore.

The coupling means couples the split sprocket to the split hub so that the tapered sprocket bore matingly engages the tapered portion of external surface of the hub. When coupled together, the sprocket segments and hub segments are self-aligning to ensure a secure fit without lineup problems.

The split hub preferably also has a flange having a plurality of passages extending through it. The split sprocket similarly defines a plurality of openings, in which each opening is in registry with a respective passage. The coupling means comprises a plurality of fasteners extending through the passages in the flange and a means for engagably mating each fastener to the respective opening in the split sprocket. The fasteners couple the flange of the split hub to the split sprocket. The fasteners preferably are a reusable, locking type that will not work loose.

The present invention can also use a key to maintain the radial position between the shaft hub assembly and the shaft. A portion of the key is disposed both in a groove in the hub bore and in a channel in the shaft, or shaft keyway. The key is captive, or completely surrounded by the split hub assembly and the shaft, and cannot escape unless the split hub is disassembled. As one skilled in the art will appreciate, a key cannot be "captive" in a prior art, non-split hub.

A captive key has practical advantages over the prior art, such as preventing the key from working loose and sliding out the end of the hub bore. Losing a key would likely disable the sprocket and, if not discovered quickly, cause substantial wear between the sprocket bore and the mating surface of the shaft. Power would be lost to the chain being driven by the prior art sprocket without a key. Another potential problem is that a different conveyor is often located underneath the shaft so that an errant key could damage other machinery.

Another advantage of the present invention is that a key of an appropriate length captive in the hub assures that the sprocket cannot "walk" or migrate along the length of the shaft.

Set screws are not needed with the present invention. Accordingly, there is no danger of set screws working loose and falling onto other conveyors with the resulting problematic consequences.

The present invention provides many other advantages over the prior art. Installation and removal of the split hub assembly are drastically easier. For example, reversing conventional sprockets on shafts with several sprockets and several bearings is time consuming and expensive. A frequent problem is that the bearings are damaged and must be replaced when they are being stripped from a shaft that has been in service for several years. The present invention allows installation and removal of the split hub and split sprocket without contacting or removing the bearings by demounting the shaft.

The split hub assembly of the present invention is desirable because split sprockets can easily be "turned." The "turned" sprockets orient a new wearing surface of the teeth onto contact with the chain approximately doubling the sprocket life. Turning the split sprocket of the present invention is much easier than using the prior art sprockets. Also, the split hub does not wear and can be used repeatedly so that only the split sprocket requires periodic replacement.

Components of the present invention can be smaller and lighter than prior art sprockets. The present invention is also easier to handle, which is helpful in constricted or awkward locations, such as under log decks, on elevator head shafts, and the like.

BRIEF DESCRIPTION OF THE FIGURES OF THE DRAWINGS

FIG. 2 is an exploded perspective view of FIG. 1 showing the unassembled components of the present invention.

DETAILED DESCRIPTION OF THE INVENTION

Figure 1:
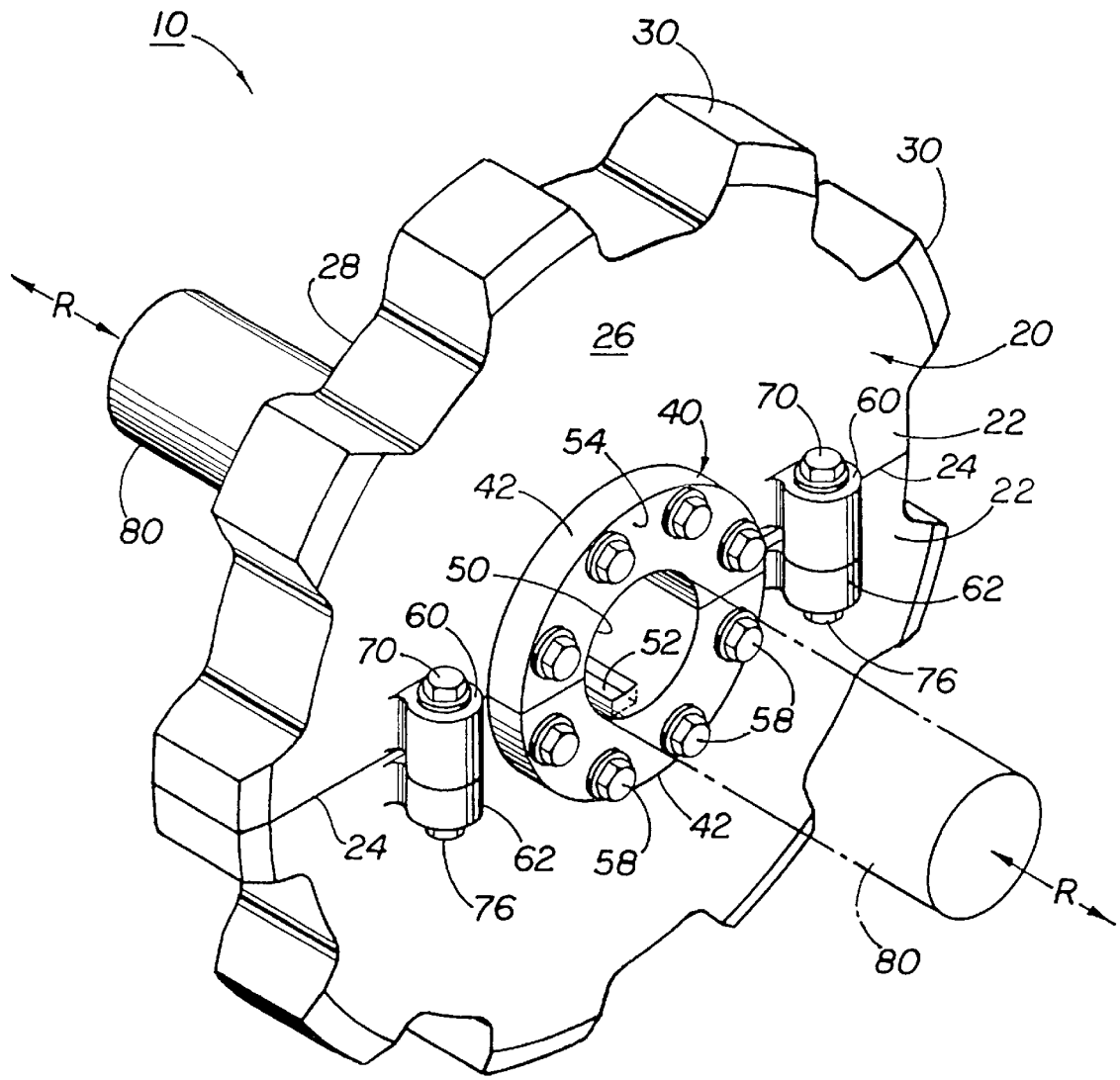
FIG. 1 is a perspective view of the preferred embodiment of the present invention assembled and disposed on a shaft.

The present invention is more particularly described in the following examples that are intended as illustrative only since numerous modifications and variations therein will be apparent to one skilled in the art. As used in the specification and in the claims, "a" can mean one or more, depending upon the context in which it is used.

Referring to FIGS. 1 and 2, the present invention is a split hub assembly 10 comprising a split sprocket 20, a split hub 40, and a means for coupling the split sprocket 20 to the split hub 40. A plurality of sprocket segments 22 forms the split sprocket 20, which is rotatable about its radial axis R. The split sprocket 20 has a first side 26, an opposed second side 28, and an engaging surface 30, which engages a chain (not shown) or similar component. The split sprocket 20 defines a sprocket bore 32 (FIG. 2) having a longitudinal axis that is coaxial with the radial axis R of the split sprocket 20. The sprocket bore 32 extends from the first side 26 to the second side 28 of the split sprocket 20 and is axially tapered so that the diameter of the sprocket bore 32 adjacent the first side 26 is larger than the diameter of the sprocket bore 32 adjacent its second side 28. Although more sprocket segments 22 can be used, it is preferred to use two segments to form the split sprocket 20 for manufacturing and installation considerations.

The present invention also comprises a means for connecting the sprocket segments 22 to each other to form the split sprocket 20. Preferably, each sprocket segment 22 has two edges 24, in which each edge 24 is in opposed relationship to the edge 24 of another sprocket segment 22 when the split sprocket 20 is formed. The preferred connecting means comprises a first connecting segment 60 that is disposed adjacent one edge 24 of each sprocket segment 22, a second connecting segment 62 that is disposed adjacent the other edge 24 of each sprocket segment 22 and in registry with one first connecting segment 60, and a means for detachably securing the first connecting segment 60 to the second connecting segment 62. The first connecting segment 60 preferably matingly engages the second sprocket segment 22, as shown in FIG. 2. As one skilled in the art will appreciate, other connecting means can be used, such as bands (not shown), connecting plates (not shown), and the like which secure the sprocket segments 22 to each other.

The first and second connecting segments 60, 62 of the preferred connecting means are constructed from round bar. The mating ends of the segments 60, 62 have a male taper 64 on one segment and a female taper 66 on the other segment. During construction, the segments 60, 62 are temporarily secured to each other and the assembly is positioned so that the first and second connecting segments 60, 62 are each disposed adjacent the edge 24 of a respective sprocket segment 22. The first and second segments 60, 62 are then welded in this position to the sprocket segments 22 in a jig (not shown). When the sprocket segments 22 are separated, the welded connecting segments 60, 62 can later be aligned in the field so that the split sprocket 20 and its bore 32 are perfectly formed.

The detachably securing means used to connect the first and second segments preferably comprises a bolt 70 and a nut 76. The bolt 70 has a top end 72 and an opposed bottom end 74 and is disposed through both the first and second connecting segments 60, 62. The nut 76 complementarily engages a portion of the bolt 70 adjacent its bottom end 74 so that the first and second connecting segments 60, 62 are disposed intermediate the top end 72 of the bolt 70 and the nut 76. Thus, the nut 76 and the bolt 70 maintain the first and second connecting segments 60, 62 in an engaged relationship with each other.

The present invention also comprises a plurality of hub segments 42 that form the split hub 40. The split hub 40 is rotatable about a radial axis, preferably the same as the split sprocket's 20 radial axis R. As with the sprocket segments 22, preferably two hub segments 42 are used, although using more segments is an option.

The split hub 40 has an external surface 44 and defines a hub bore 50 extending therethrough. The hub bore 50 has a longitudinal axis which is coaxial with the radial axis R of the split hub 40 and is of a size to be disposed around a shaft 80 so that the split hub 40 maintains a constant radial position relative to the shaft 80. At least a portion of the external surface 44 of the split hub 40 is tapered to be complementarily received within the tapered sprocket bore 32. The tapered external surface 44, accordingly, has a wide end 46 and an opposite narrow end 48.

The coupling means positions the hub segments 42 to each other to form the split hub 40. The coupling means also couples the split sprocket 20 to the split hub 40 so that the tapered sprocket bore 32 matingly engages the tapered portion of the hub, whereby the split sprocket 20 is securely connected to the split hub 40. When coupled together, the first side 26 of the split sprocket 20 is disposed adjacent the wide end 46 of the external surface 44 of the split hub 40.

Preferably, the split hub 40 also has a flange 54 extending therefrom which is located adjacent the wide end 46 of the external surface 44 of the split hub 40. The flange 54 defines a plurality of passages 56 therethrough. In conjunction, the split sprocket 20 defines a plurality of openings 34, in which each opening 34 is in registry with a respective passage 56.

In the preferred embodiment, the coupling means comprises a plurality of fasteners 58 and a means for engagably mating each fastener 58 to a respective opening 34 in the split sprocket 20. Each fastener 58 extends through a passage 56 in the flange 54 and into a respective opening 34 in the split sprocket 20 so that the fastener 58 couples the flange 54 to the split sprocket 20. As shown in FIG. 2, the preferred embodiment uses either six (6) or eight (8) threaded fasteners 58 that are disposed through the hub flange 54 and into drilled and tapped openings 34 in the split sprocket 20. As one skilled in the art will appreciate, the fasteners 58 can alternately extend through the openings 34 in the split sprocket 20 and engagably mate with a nut (not shown) or other similar component, instead of mating with complementarily threaded openings 34 in the split sprocket 20.

The fasteners 58 preferably are cap screws, specifically a "WIZ-LOC"® manufactured by McClain-Fogg, Inc., or a similar type that is plated to prevent rusting and seizing. The preferred cap screws also have a serrated washer (not shown) that is forged as an integral part of its head. This type fastener 58 does not require a separate, removable washer, which is a convenience in field assembly. More importantly, when properly tightened, the fasteners 58 and integral washer combinations will not work loose, which is important in bulk handling facilities, such as paper mills. As one skilled in the art will appreciate, lost fasteners 58 or washers can reach the mill and result in detrimental and expensive consequences.

To install the present invention, the hub segments 42 are placed around the shaft 80 to form the split hub 40 and the tapered sprocket bore 32 of the split sprocket 20 is disposed over the tapered portion of the external surface 44 of the split hub 40. The fasteners 58 are fitted through the passages 56 in the flange 54 and screwed into the openings 34 in the assembled split sprocket 20. The fasteners 58 are then equally tightened to draw the split sprocket 20 evenly onto the tapered portion of the split hub 40. The machinist applies sufficient torque to each fastener 58 to ensure that the split sprocket 20 tightly fits on the split hub 40 so that the split sprocket 20 is locked in position and will not slip on the split hub 40 under a load.

The tapered bore of the split sprocket 20 and the tapered portion of the external surface 44 of the hub should fit together within exacting tolerances. The alignment between the split sprocket 20 and the hub segments 42 of the split hub 40 is important to ensure optimal performance. The split sprocket 20, which is disposed over a portion of the exterior surface of the split hub 40, maintains the hub segments 42 in the correct alignment. The "force-fit" design using the complementarily tapered shapes provides an extremely tight fit on the shaft 80, eliminating the possibility of the sprocket "walking" along the length of the shaft 80 or undesirable radial movement relative to the shaft 80. For removal, the fasteners 58 can be "broken loose" by the application of sufficient force and they can be used again.

Proper installation of the split sprocket 20 on the split hub 40 creates sufficient friction between the split hub 40 and the shaft 80 that little likelihood of relative movement exists. Nevertheless, a key 90 is used in the preferred embodiment to ensure the alignment is maintained. The hub bore 50 preferably defines an axially-extending groove 52 therein and the shaft 80 defines a channel 82, wherein the key 90 is disposed therebetween. The key 90 ensures that the split hub 40 is radially fixed relative to the shaft 80. Preferably, the manufacturer can mill the groove 52 and channel 82, or keyway, long enough to carry the torque load between the split hub 40 and the shaft 80, but the keyway does not have to extend to the wide end 46 or narrow end 48 of the hub bore 50.

The keyway thus is closed at both ends so the key 90 is captured, or completely surrounded. The key 90 is placed in its position before assembly of the split hub 40 and is trapped there. The key 90 cannot work loose and fall out. In contrast, loss of the key from a prior art device will usually result in the sprocket freely turning on the shaft 80. The lost key may also result in equipment damage.

Due to the high friction between the shaft 80 and split hub 40, set screws (not shown) are not required. Therefore, there are no set screws to work loose and fall into chip conveyors or other material streams where they might cause damage to machinery.

An optional feature of the present invention is that the split sprocket 20 is engagable with slotted bolt holes in the hub (not shown). On multi-strand lugged transfer decks, this allows accurate alignment and is also helpful for other precision timing functions.

Another advantage of the present invention is that since both the hub 40 and the sprocket 20 are split, they can easily be installed or removed. The split sprocket 20 of the present invention, moreover, can be installed in place on the shaft without the time-consuming and expensive process of demounting the shaft and stripping sprockets and bearings required with the prior art devices. That is, replacement of a prior art sprocket on a long shaft with several other sprockets and bearings requires the worn or damages sprocket to be slid, if space permits, along the shaft out of operative position. The split hub assembly of the present invention can then be installed in its place. If space is not available to slide the existing prior art sprocket out of the way, the sprocket can be cut off of the shaft and then the present invention can be installed. The present invention avoids the damage that can occur when bearings are stripped from the shaft.

Because most sprockets in the field run primarily in one direction, some mills and other users of these components have found that timely reversal of sprockets on the shaft brings the unworn side of the sprocket teeth into contact with the chain. The life of a sprocket can be extended up to 100% by "turning" in this manner.

Another aspect of the present invention is that, within a given shaft diameter range, split sprockets 20 of different sizes can be constructed to be interchangeable with a single split hub 40. Also, different split sprockets can engage different sizes of chain and use a different number of teeth. The interchangeable split sprockets allow mills to have a replacement supply of sprockets for when changes are required. Thus, a relatively small investment in assorted split hubs that fit different shaft sizes and assorted split sprockets provides "on hand" protection against downtime that can result from unexpected sprocket failure.

Preferably, all components of the present invention are constructed of steel and all fasteners are heat-treated. The hub segments, sprocket segments, and other components are not required to be hardened, but flame hardening or carburizing may be desired, depending on the environment in which the components are used. Other options include constructing the components of special alloys, using either a double/single sprocket design on each split hub, and using a hunting tooth design on the split sprockets.

The present invention has been discussed in terms of operating with a chain. However, as one skilled in the art will appreciate, the present invention can be applied to other devices, such as V-sheaves, pulleys, gears, brake components, and other rotating devices.

Although the present invention has been described with reference to specific details of certain embodiments thereof, it is not intended that such details should be regarded as limitations upon the scope of the invention except as and to the extent that they are included in the accompanying claims.

What is claimed is:

1. A split hub assembly, comprising:
  a. a pair of sprocket segments that form a split sprocket that is rotatable about a radial axis thereof, the split sprocket having a first side, an opposed second side, and an engaging surface and defining a sprocket bore having a longitudinal axis which is coaxial with the radial axis of the split sprocket and extending therethrough from the first side to the second side, the sprocket bore having a diameter and being axially tapered from the first side to the second side so that the diameter of the sprocket bore adjacent the first side is larger than the diameter of the sprocket bore adjacent the second side;
  b. means for connecting the sprocket segments to each other to form the split sprocket;
  c. a pair of hub segments that form a split hub that is rotatable about a radial axis thereof, the split hub having an external surface and defining a hub bore therethrough having a longitudinal axis which is coaxial with the radial axis of the split hub, the hub bore being of a size to be disposed around a shaft so that the split hub maintains a constant radial position relative to the shaft, at least a portion of the external surface of the split hub being of a size that is tapered to be complementarily received within the taper of the sprocket bore, the external surface having a wide end and an opposite narrow end; and d. means for coupling the hub segments to each other to form the split hub and for coupling the split sprocket to the split hub so that the tapered sprocket bore matingly engages the tapered portion of the hub, whereby the split sprocket is securely connected to the split hub, and wherein the first side of the split sprocket is adjacent the wide end of the external surface of the split hub.

2. The split hub assembly of claim 1, wherein the split hub has a flange extending therefrom and disposed adjacent the wide end of the external surface of the split hub, the flange defining a plurality of passages therethrough, wherein the split sprocket defines a plurality of openings therein, each opening being in registry with a respective passage, and wherein the coupling means comprises:

a. a plurality of fasteners, each fastener extending through one passage in the flange and into one opening in the split sprocket; and b. means for engagably mating each fastener with one respective opening in the split sprocket so that the fastener couples the flange of the split hub to the split sprocket.

3. The split hub assembly of claim 2, wherein the engagably mating means comprises at least a portion of each fastener being threaded and a portion of the opening in the split sprocket having a complementarily threaded surface.

4. The split hub assembly of claim 1, wherein the hub bore defines an axially-extending groove therein and wherein the shaft defines a channel in a portion thereof, the split hub assembly further comprising a key, wherein a portion of the key is disposed in the groove of the hub bore and another portion of the key is disposed in the channel of the shaft, whereby the key ensures that the split hub is radially fixed relative to the shaft.

5. The split hub assembly of claim 1, wherein each sprocket segment has two edges in which each edge is in opposed relationship to the edge of another sprocket segment when the split sprocket is formed, and wherein the connecting means comprises:

a. a first connecting segment disposed adjacent one edge of each sprocket segment;

b. a second connecting segment disposed adjacent the other edge of each sprocket segment and in registry with the first connecting segment, wherein the first connecting segment on one sprocket segment matingly engages the second sprocket segment on another sprocket segment when the split sprocket is formed; and c. means for detachably securing the first connecting segment on one sprocket segment to the second connecting segment on another sprocket segment.

6. The split hub assembly of claim 5, wherein the detachably securing means comprises:

a. a bolt having a top end and an opposed bottom end, wherein the bolt is disposed through the first and second connecting segments; and b. a nut that complementarily engages a portion of the bolt, wherein the nut complementarily engages the bolt adjacent its bottom end so that the first and second connecting segments are disposed intermediate the top end of the bolt and the nut, whereby the nut and the bolt maintain the first and second connecting segments complementarily engaged with each other.

\* \* \* \* \*